United States Patent
Douzane et al.

(10) Patent No.: US 8,169,354 B2
(45) Date of Patent: May 1, 2012

(54) APPARATUS AND METHODS THEREOF FOR REDUCING ENERGY CONSUMPTION FOR PWM CONTROLLED INTEGRATED CIRCUITS IN VEHICLES

(75) Inventors: Khaled Douzane, Antibes (FR); Pascal Jullien, Vence (FR)

(73) Assignee: Scaleo Chip, Valbonne, Sophia Antipolis (FR)

( * ) Notice: Subject to any disclaimer, the term of this patent is extended or adjusted under 35 U.S.C. 154(b) by 259 days.

(21) Appl. No.: 12/629,603

(22) Filed: Dec. 2, 2009

(65) Prior Publication Data

US 2011/0128177 A1    Jun. 2, 2011

(51) Int. Cl.
*H03M 1/12* (2006.01)
(52) U.S. Cl. .................................. 341/155; 341/142
(58) Field of Classification Search .................. 341/155, 341/143, 122, 114, 142; 375/238
See application file for complete search history.

(56) References Cited

U.S. PATENT DOCUMENTS

| | | | |
|---|---|---|---|
| 5,551,044 A * | 8/1996 | Shah et al. | 713/323 |
| 6,138,047 A | 10/2000 | Proffitt et al. | |
| 6,545,621 B1 | 4/2003 | Madni et al. | |
| 6,556,160 B1 | 4/2003 | Kamel et al. | |
| 7,046,184 B2 * | 5/2006 | Kumakura | 341/155 |
| 7,242,330 B2 | 7/2007 | Alter | |
| 7,391,196 B2 | 6/2008 | Fosler | |
| 7,428,159 B2 | 9/2008 | Leung et al. | |
| 7,830,295 B2 * | 11/2010 | Ikeda et al. | 341/172 |
| 2006/0209684 A1 * | 9/2006 | Bei | 370/229 |
| 2007/0248047 A1 * | 10/2007 | Shorty et al. | 370/329 |

* cited by examiner

*Primary Examiner* — Peguy Jean Pierre
(74) *Attorney, Agent, or Firm* — Blakely Sokoloff Taylor & Zafman LLP

(57) ABSTRACT

An apparatus, protocol and methods for reducing vehicle energy consumption and for precise electronic event control, by implementing full CPU off-loading, using pulse-width modulation (PWM) with analog feedback diagnosis enabling real-time operation. Accordingly, analog feedback is used for external integrated circuits (IC) controlled by a PWM output, for processes to be analyzed. The apparatus includes a microprocessor that integrates an autonomous PWM module and an analog-to-digital converter (ADC) group manager, each including register modules for enabling analog-to-digital signal conversion comparisons of PWM feedback data, and generating of an interrupt commands when required.

17 Claims, 4 Drawing Sheets

APPARATUS AND METHODS THEREOF FOR REDUCING ENERGY CONSUMPTION FOR PWM CONTROLLED INTEGRATED CIRCUITS IN VEHICLES

BACKGROUND OF THE INVENTION

1. Field of the Invention

The present invention relates generally to systems and methods for enhancing the functionality of microcontrollers. More specifically, it relates to an enhanced microcontroller system used in control applications such as automotive applications, and methods thereof.

2. Prior Art

Many circuit applications are known to exist that require determination of the frequency, phase & amplitude of an analog signal for precise event control. In the automotive industry, for example, a variety of vehicle operation sensors (e.g., engine sensors) typically produce analog signals that are used by one or more on-board processors to control various aspects of a vehicle's events operation.

In some cases, information may be extracted from the analog signal by interpreting its frequency, phase and amplitude which may vary with engine/vehicle operation. One commonly employed technique for extracting information of an analog signal requires first converting the analog signal to a digital signal, and then processing the converted digital signal in a known manner to determine the relevant data. Such a technique is commonly employed in systems that include a microprocessor, particularly since microprocessors are typically equipped with a number of analog-to-digital (A/D) inputs operable to convert analog signals to digital signals for further processing by the microprocessor.

Pulse-width modulation (PWM) of a signal or power source involves the modulation of its duty cycle, to either convey information over a communications channel or control the amount of power sent to a load. PWM is essentially a way of digitally encoding analog signal levels. Through the use of high-resolution counters, for example, the duty cycle of a square wave is modulated to encode a specific analog signal level. The PWM signal is still digital because, at any given instant of time, the full DC supply is either fully on or fully off. The voltage or current source is supplied to the analog load by means of a repeating series of on and off pulses. The on-time is the time during which the DC supply is applied to the load, and the off-time is the period during which that supply is switched off. Given a sufficient bandwidth, any analog value can be encoded with PWM.

By controlling analog circuits digitally, system costs and power consumption can be drastically reduced. What's more, many microcontrollers and Digital Signal processors (DSPs) already include on-chip PWM controllers, making implementation easy.

One of the advantages of PWM is that the signal remains digital all the way from the processor to the controlled system; no digital-to-analog conversion is necessary. By keeping the signal digital, noise effects are minimized. Increased noise immunity is yet another benefit of choosing PWM over analog control, and is the principal reason PWM is sometimes used for communication. Switching from an analog signal to PWM can increase the length of a communications channel dramatically.

One limitation of typical PWM usage is that it requires real-time processing for a precise event control and also manual checking of the analog status of external components, such as Integrated Circuits (ICs) controlled by PWM output. Examples of IC controlled by PWM with analog feedback include: SmartPower lighting controller for lighting control, H Bridge driver (needle motor control), Cooling fan motor control, and valve control. This being the case, frequent checking of such parameters may often have a negative effect on the microprocessor performance, as it may burden the processor with frequent demanding requests.

Thus, there is a need in the art to enable the automated checking of the analogs status of external ICs controlled by PWM outputs, as well as methods thereof to offload the CPU for reaching real-time performance.

DETAILED DESCRIPTION OF THE PREFERRED EMBODIMENTS

Figure 1A:
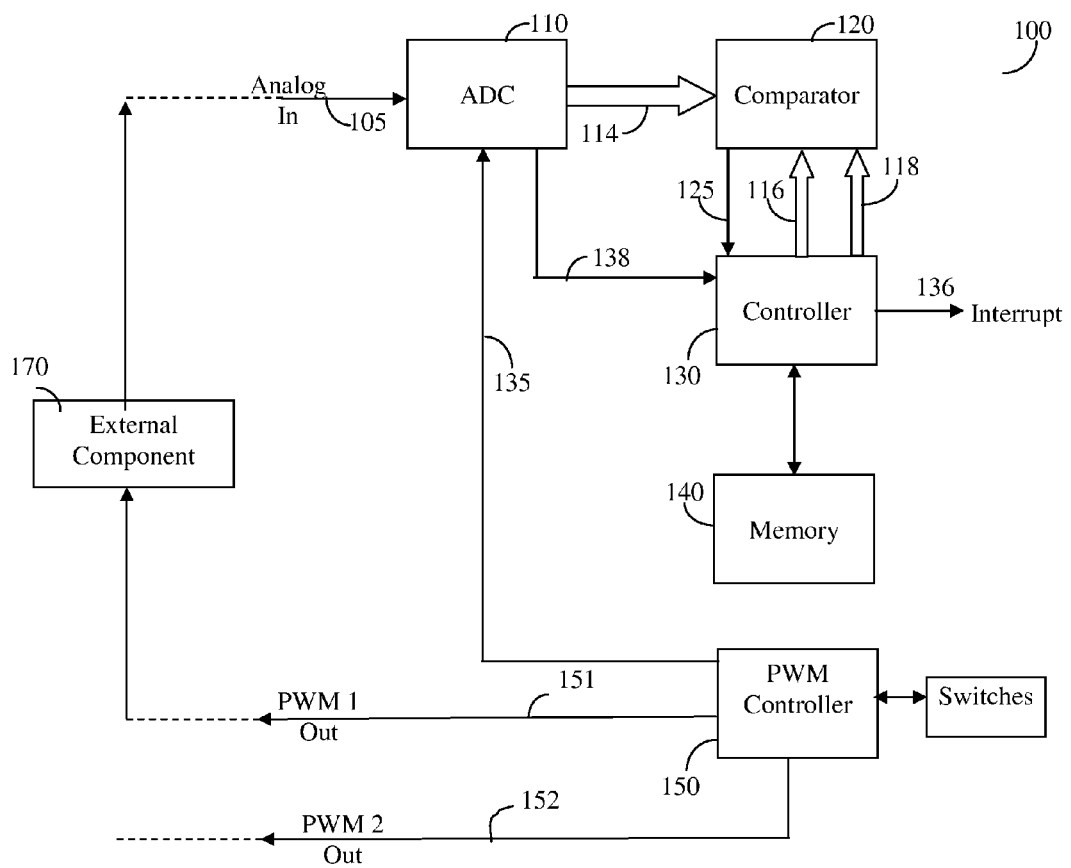
FIG. 1A is a schematic block diagram for checking an analog status of a PWM controlled integrated circuit.

An apparatus, protocol and methods are herein provided, according to some embodiments, for reducing vehicle energy consumption and for enhancing precise electronic event control, by fully CPU off-loading pulse-width modulation (PWM) with analog feedback diagnosis and by solving the real-time issue when this is run mainly with the CPU. Accordingly, analog feedback is used for external integrated circuits (IC) controlled by a PWM output, for processes to be analyzed. The apparatus includes a microprocessor that integrates an autonomous PWM module and an analog-to-digital converter (ADC) group manager, each including register modules for enabling analog-to-digital signal conversion comparisons of PWM feedback data, and generating of an interrupt commands when required. The above apparatus, protocol and methods may help reduce vehicle energy consumption and in-vehicle electronic event control, for example, by solving the lamps control, led control, any in-vehicle motor control and battery fluctuation control, etc.

Furthermore, an apparatus, protocol and methods are herein provided, according to some embodiments, to enhance the microcontroller system based on analog diagnosis of external integrated circuits used in control applications for precise electronic event control.

Furthermore, an apparatus, protocol and methods are herein provided, according to some embodiments, to desynchronize each PWM channels to allot enough time for the CPU to make the PWM configuration at the right time if needed for precise electronic event control, for each PWM channel. Accordingly, each PWM channel may generate edges at substantially the same time, and the Microcontroller may be adapted, using a PWM desynchronization function, to control the duration between the different PWM Channels edges, thereby enabling a precise event control.

According to some embodiments of the present invention, a microprocessor or a microcontroller, e.g., easyBCU produced by Scaleo Chip of Valbonne, Sophia Antipolis, France, which is the assignee of the invention herein, may have enhanced hardware functionalities by being enabled to automatically check analog status of external vehicle ICs controlled by PWM output, and by providing controllable duration between each PWM channel edge. This function may be both configurable and automated. Embodiments of the present invention provide an apparatus, protocol and methods for enhancing the performance of microprocessors used in automotive applications.

For example, without negatively affecting system performance (e.g., ARM Cortex-M3 processor efforts), the analog status of external ICs controlled by PWM outputs can be converted automatically into, for example, 10 bits digital data, and compared to two programmable 10 bits digital voltage references, corresponding to a lower voltage reference and an upper voltage reference. If the status does not match with the voltage reference range, an interrupt may be generated to indicate a mismatch to the microprocessor or the microcontroller. The delay between PWM output command and the analog feedback sampling, and the subsequent ADC conversion triggering is programmable into the PWM module (ADC conversion is generally preceded by a sampling of the analog signal, and in some cases in this disclosure, it is assumed that after a trigger, analog sampling precedes the ADC conversion). The delay between the different PWM channel edges (see FIG. 1B) is controllable to allot enough time to the CPU to make PWM configuration adaptation if required. This method thereby helps solve the real-time issue relevant to the precise electronic event control.

Figure 1B:
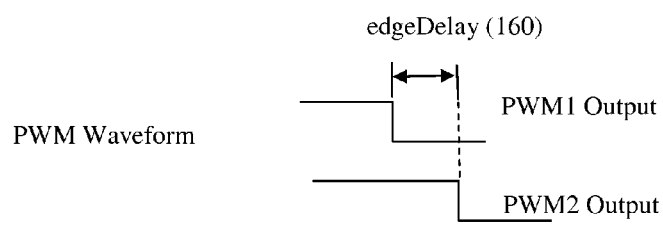
FIG. 1B illustrates the controllable or programmable delay between the different PWM channel edges to allot enough time to the CPU to make PWM configuration adaptation, if required.

Reference is now made to FIG. 1A where an exemplary and non-limiting schematic block diagram 100 for checking an analog feedback status of external sensor controlled by a PWM is shown. A PWM Controller 150 generates an output signal 151 to an external component 170. The external component may be but is not limited to, SmartPower lighting controller for lighting control, H Bridge driver (needle motor control), cooling fan motor control, and valve control. An analog to digital converter (ADC) 110 receives an analog input 105 (external feedback status of the component 170) and converts it into a digital representation under the control of PWM trigger signal 135, thereby triggering the analog conversion provided from PWM controller 150. A feedback loop is therefore created, in a sense, enabling the appropriate PWM control by means of relevant analog input diagnosis. The ADC 110 is coupled to a comparator 120 which at the end of the conversion given by the signal 138 compares the digital value of the converted analog input signal on bus 114 to a lower level limit provided on bus 116 and an upper level limit provided on bus 118. The comparison result of the comparator 120 is provided to the controller 130 through the signal 125. The upper and lower level values may be programmable and stored, for example, in memory 140 that is coupled to controller 130. The memory may be registers, random access memory, programmable memory, and other types of memory units. The controller 130 is further programmed to provide an interrupt signal 136 if the digital value provided on bus 114 is not between the values provided on busses 116 and 118, i.e., below the lower level limit or above the upper level limit. To allot enough time of treatment between PWM channel edges (see FIG. 1B), the PWM channel provide flexibility using the "edgeDelay" 160, thereby allowing the user to program a delay between each PWM channel edge. As represented in FIG. 1B, (with the PWM channel 1 (151) and PWM channel 2 (152), respectively relevant to PWM1 output and PWM2, output an "edge delay" duration 160, which is maintained between the PWM1 output edge and the PWM2 output edge. In this way the CPU has enough time to make PWM configuration adaptation and treat other tasks of the application during the time defined by 160. Moreover, the above described system may help determine the optimum current, and reduce the car system consumption. The above may further help avoid dazzle troubles generated by the led car lighting technology.

Figure 2:
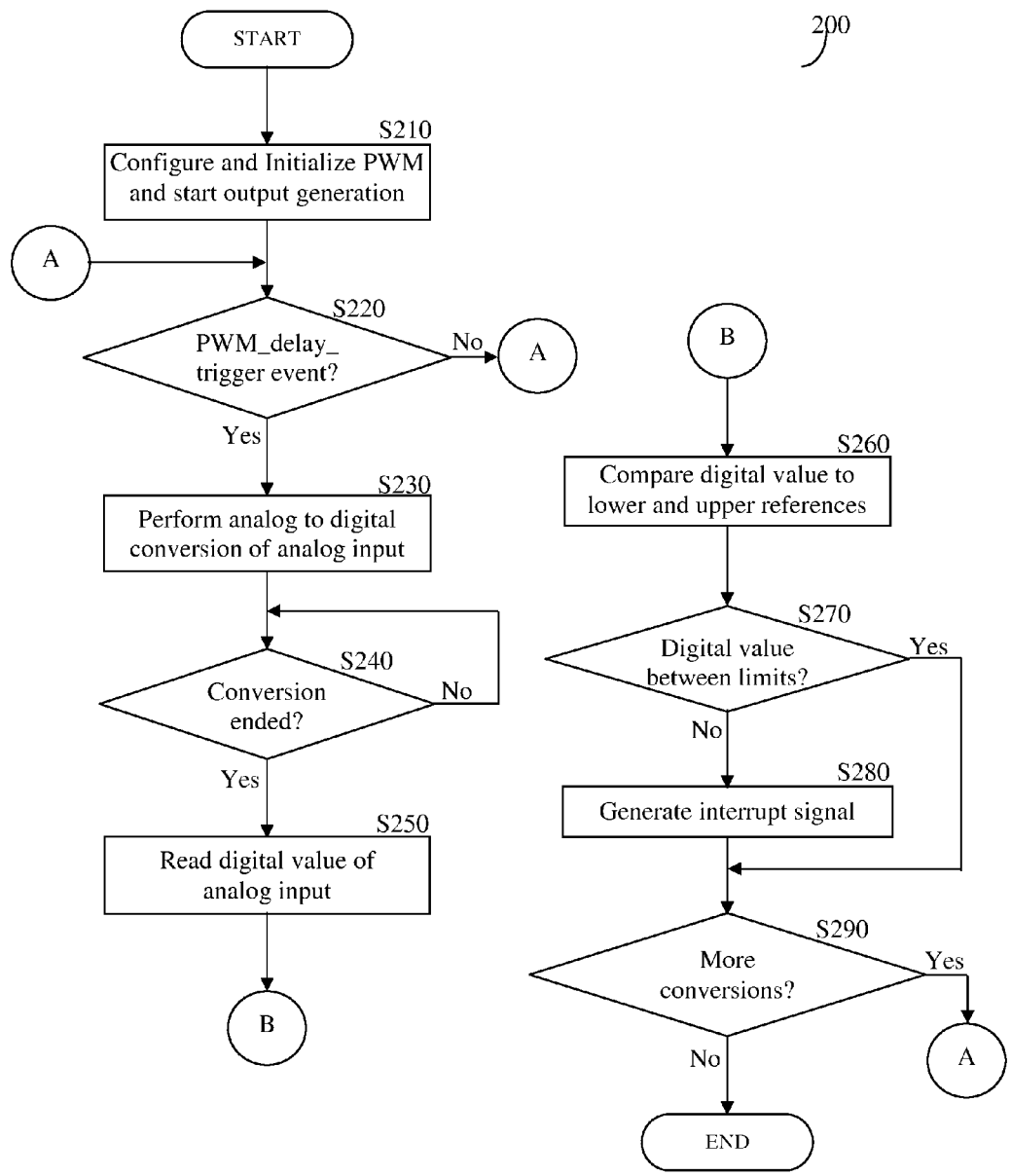
FIG. 2 is a flowchart of the principle of operation for checking an analog status of a PWM controlled integrated circuit.

The method of operation of such an apparatus shown with respect to FIG. 1A is now discussed with respect to FIG. 2, which is an exemplary and non-limiting flowchart 200 of the principle of operation for checking an analog status of a PWM controlled integrated circuit. In S210 the ADC 110 and the PWM 150 are initialized (for the ADC 110: Upper and Lower limit value setting; for the PWM 150: the configuration of pulse width, period and PWM delay trigger durations). After configuration the generation of the PWM output is started. In S220 the PWM_delay_trigger signal is checked, and if appropriate execution continues with S230; otherwise, execution continues with S220. In S230 the ADC 110 performs a conversion of an analog input signal to a digital representation. In S240 it is checked whether the conversion has completed and if so execution continues with S250; otherwise, execution continues with S240. The amount of time allotted for the conversion may be programmed. This is typically to provide sufficient time for the analog to digital conversion to take place. In S250 the digital value is read from the ADC 110. In S260 the digital value is compared to a lower level limit and an upper level limit. In S270 it is checked if the result of the comparison is that the digital value is between the lower limit level and the upper limit level and if so execution continues with S290; otherwise, execution continues with S280. In S280 an interrupt signal is generated to indicate that the digital value was found not to be between the lower level limit and the upper level limit. It should be noted that these values may be programmed. In S290 it is checked whether additional conversions are to be made and if so, execution continues with S220; otherwise, execution terminates.

Figure 3:
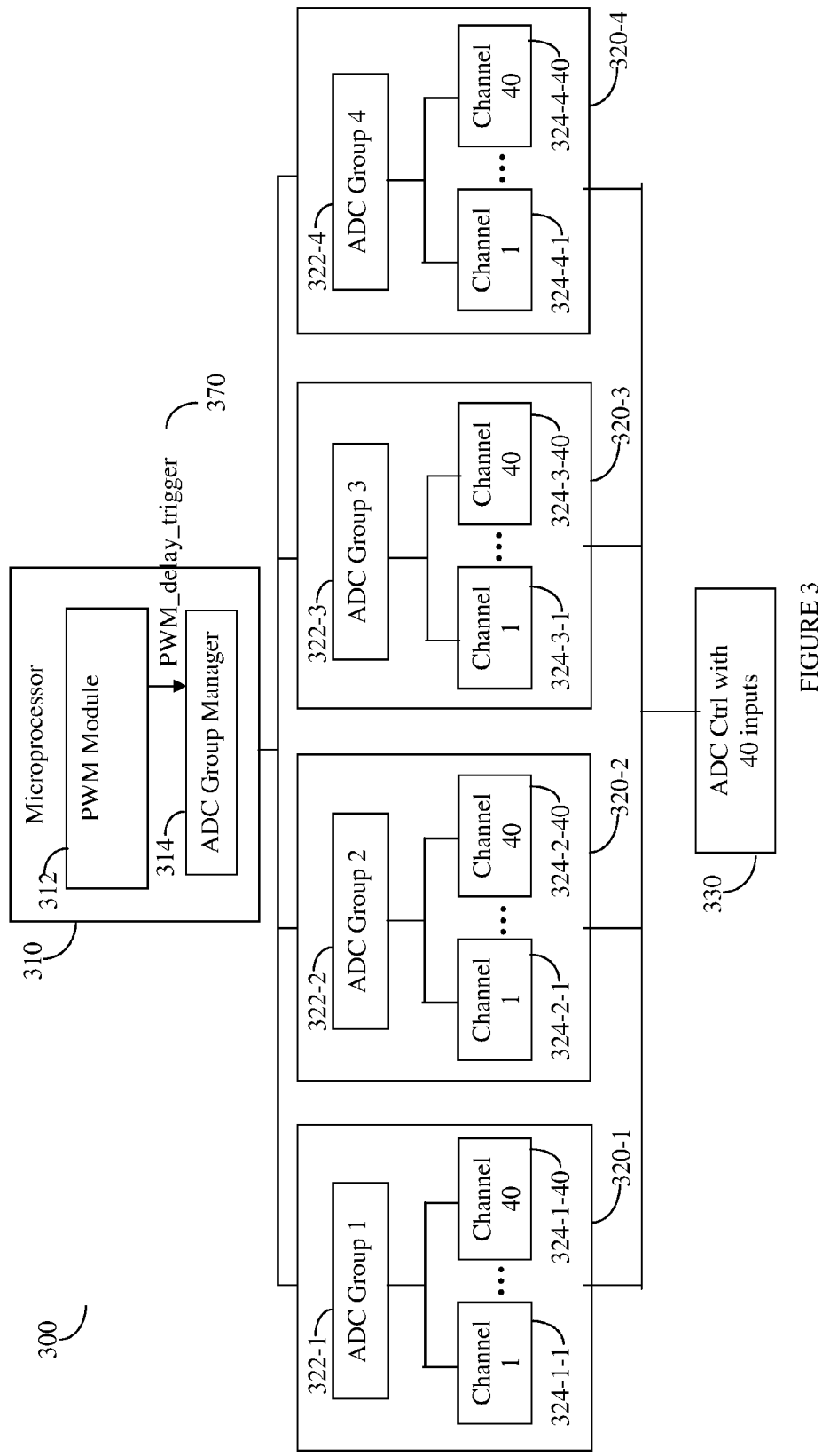
FIG. 3 is a block diagram of an enhanced microprocessor with an integrated ADC Group management system.

In one embodiment, as can be seen with reference to FIG. 3, a controller 310 is equipped with a PWM module 312 and an ADC group manager (ADCGM) 314. A conventional ADC controller with multiplexed inputs treats the conversion simply by following the order it receives the conversion commands from the CPU. In contrast, the ADCGM classifies the command first by its priority and its periodicity. Subsequently the ADCGM collects conversion commands per "ADC Group" 320_x and provides a priority for each "ADC Group", since all ADC Groups are supposed to send command conversions to the same "ADC Ctrl". The ADCGM may then gather different commands for each ADC Group. "ADC Group" is supposed to work with the same rules. This may include, but is not limited to: (i) Triggering rules: Using the same HW trigger (e.g., external signal from PWM), same SW trigger (e.g., command from CPU), or same Periodic trigger (configured within the ADCGM); (ii) Autonomous rules: Automatically converting the informed channels after each trigger; (iii) Comparison rules: Using the same UVR, LVR value, or no comparison; and, (iv) priority of conversion.

In the example described in FIG. 3, the ADCGM has not fixed the number of "ADC groups", which may be, for example, 2, 4, 8 etc., depending on the application required. In the above case, for example, the PWM feedback diagnosis may have the following configuration for an ADC group: (i) Triggering with the PWM_delay_trigger signal 370; (ii)

Autonomous mode: configured with the relevant ADC channel input; (iii) Comparison mode: enabled +Value configured; and, (iv) Priority mode: Group with first or second priority. The above modes may be configured with the appropriate time between conversions.

In the exemplary and non-limiting FIG. 3, controller 310 offers connectivity to four "ADC groups" 320_x having, for example, the capability to manage up to 40 channels each. The ADC Group Manager controls an ADC Ctrl having, for example a resolution of 10 bits and 40 channels input. The conversion from analog to digital can be done in a one shot mode or a continuous mode. The delay between each sampling and the sampling sequence are configurable. An interrupt can be generated after each end of conversion. Controller 310 may be, but is not required to be, a microcontroller or a microprocessor. ADCGM 314 is responsible for the management of the analog inputs by groups. That is, handling the analog inputs from, for example group 1, 322-1, in a timely manner, and under the control of the microprocessor 310. This enables to handle anyone of the analog inputs, in this example some 40 different analog inputs from the ADC Ctrl 330, by elements of controller 310. This is possible due to the relative slow changes of the analog input signals versus the operation speed of controller 300 in general, and the ADCGM 314 in particular. In this exemplary and non-limiting embodiment up to 4 groups can be defined, each group having up to 40 channels 324. The group priority is configurable. In accordance with the disclosed invention, for each group, a lower voltage reference (LVR) and an upper voltage reference (UVR) can be programmed. The ADCGM 314 can compare these voltage references to all samplings of the same group. If the sampling is not in the voltage reference range, e.g., lower than the LVR or higher than the UVR, an interrupt may be automatically generated. The above described mechanism can be used in one shot sampling mode or in continuous sampling mode. The trigger(s) to launch the conversion may be generated by the PWM module 312 which manages the PWM output to be checked. As can be seen in FIG. 3, a group/family of PWM outputs may be managed with an ADC group. For example, one trigger of PWM to the ADC group is selected to launch the conversion, where the relevant Group PWM analog feedback should be part of the ADC group. In the ADC group, every analog input is converted on each PWM delay trigger and is checked with the same UVR and LVR. In one embodiment of the disclosed invention it is possible to set at least one of the low reference voltage and the high reference voltage for each of the analog inputs. The comparison will then take place to the uniquely set reference values of each of the input signals upon its comparison period.

Figure 4:
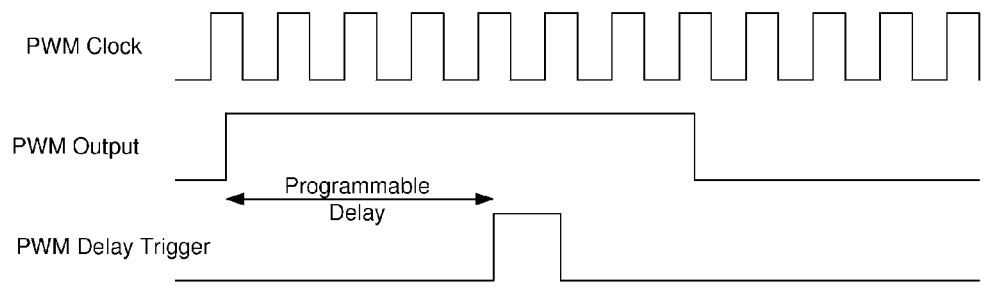
FIG. 4 is a schematic timing diagram showing the PWM output and an ADC conversion trigger process.

Reference is now made to FIG. 4 where an exemplary and non-limiting schematic timing diagram showing the PWM output and a PWM Delay Trigger for ADC conversion with respect to a PWM clock. According to some embodiments, a PWM module 312, of the controller 310, may generate digital pulses with programmable pulse width and period. The PWM module 312 additionally generates a trigger (PWM_delay_trigger signal 370) for the ADCGM 314. The delay between the PWM pulse and the PWM Delay Trigger is programmable, and therefore controllable. The PWM module, as described above, is able to generate a start ADC conversion signal through the PWM Delay Trigger. The delay between the pulse generated on the PWM output and the PWM Delay Trigger is configurable in the PWM Feedback Register of the PWM module. The selected minimum delay may be configured, e.g., one clock cycle of the PWM clock.

Figure 5:
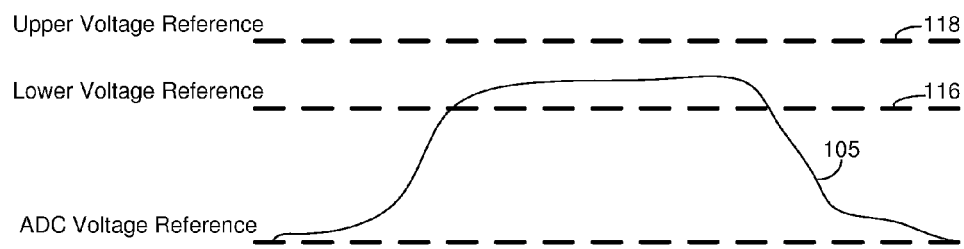
FIG. 5 is a schematic timing diagram showing the analog input signal in comparison with the reference voltages.

FIG. 5 shows an exemplary and non-limiting schematic timing diagram of the analog input signal 105 in comparison with the reference voltages 116 and 118. The input signal 105 is compared to the lower limit 116 and the upper limit 118 programmed, for example, into the ADCGM 314 compare register, or otherwise into memory 140.

Figure 6:
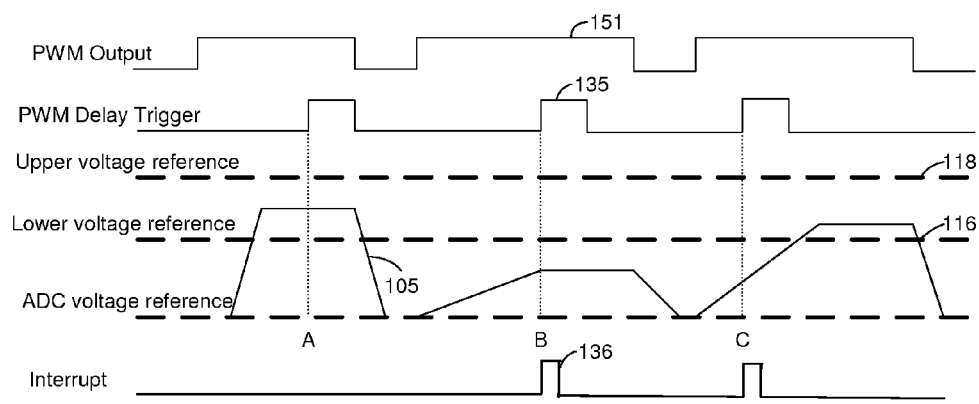
FIG. 6 is a schematic timing diagram showing different comparison results of the system in accordance with the invention.

FIG. 6 shows an exemplary and non-limiting schematic timing diagram of different comparison results of the system, for example system 100, in accordance with the invention. In the case depicted as "A" the comparison detects a positive result at the PWM ADC trigger 135 as the analog input signal 105 is in between the lower voltage reference 116 and the upper voltage reference 118, at the time of comparison. By contrast, in both cases depicted as "B" and "C" an interrupt on interrupt signal 136 will be generated as at the time of the comparison the value of the input signal 105 is not between the lower voltage reference 116 and the upper voltage reference 118.

While the invention was described with respect to specific embodiment, a person skilled-in-the-art would readily realize that other embodiments are possible without departing from the scope of the disclosed invention. Such embodiments should be considered to be an integral part of this invention.

What is claimed is:

1. An apparatus for enhancing electronic event control comprising:
   an analog input;
   an analog to digital converter (ADC) enabled to convert an analog signal sampled from said analog input into a digital value responsive of a trigger;
   a pulse width modulation (PWM) unit enabled to provide said trigger to said ADC;
   a digitally programmable comparator enabled to compare said digital value to a first reference value and to further compare said digital value to a second reference value, said first reference value being different from said second reference value, said digitally programmable comparator further enabled to provide an indication when said digital value is a value that is not in between said first reference value and said second reference value; and
   an interrupt unit enabled to generate an interrupt signal responsive to said indication from said digitally programmable comparator.

2. The apparatus of claim 1, wherein the apparatus is configured to control a smart power controller.

3. The apparatus of claim 1, wherein said first reference value and said second reference value are programmable values.

4. The apparatus of claim 1, wherein conversion of said analog signal begins responsive of a trigger from said PWM unit.

5. A method for enhancing electronic event control comprising:
   generating a trigger;
   sampling analog input signal responsive of the trigger;
   generating a digital value corresponding to the sample of said analog signal;
   comparing said digital value to a first reference value and a second reference value;
   generating an interrupt signal if it is determined that said digital value is not between said first reference value and said second reference value; and
   programming a delay value such that said sampling of the analog signal occurs at a programmed delay value after said trigger.

6. The method of claim 5, wherein said trigger is a PWM pulse.

7. The method of 5, further comprising:
providing the analog input signal from a lighting controller.

8. An apparatus comprising:
- a plurality of analog inputs, said plurality of analog inputs grouped in two or more groups of analog inputs;
- an analog to digital converter group manager (ADCGM) coupled to each of said two or more groups of analog inputs and enabled to convert an analog signal sampled from said analog input into a digital value responsive of a trigger;
- a pulse width modulation (PWM) unit coupled to said ADCGM and enabled to provide said trigger to said ADCGM;
- a digitally programmable comparator enabled to compare said digital value to a first reference value and to further compare said digital value to a second reference value, said first reference value being different from said second reference value, said digital programmable comparator further enabled to provide an indication when said digital value is a value that is not in between said first reference value and said second reference value; and
- an interrupt unit enabled to generate an interrupt signal responsive of said indication from said digitally programmable comparator.

9. The apparatus of claim 8, wherein the apparatus is configured to control a smart power controller.

10. The apparatus of claim 8, wherein said first reference value and said second reference value are programmable values.

11. The apparatus of claim 8, wherein conversion of said analog signal begins responsive of a trigger from said PWM unit.

12. The apparatus of claim 8, wherein at least one of said first reference value and said second reference value is set uniquely for an analog input of said plurality of analog inputs.

13. A method comprising:
- generating a trigger using a pulse width modulation (PWM) module:
- sampling an analog input signal from a plurality of analog input signals and performing an analog to digital conversion of an sampled analog input signal;
- generating a digital value corresponding to an analog value of said analog signal;
- comparing said digital value to a first reference value and a second reference value;
- generating an interrupt signal if it is determined that said digital value is not between said first reference value and said second reference value;
- programming a delay such that said sampling an analog input signal occurs at a programmed delay value after said trigger; and
- repeating the method for another analog input signal.

14. The method of claim 13, wherein said trigger is a PWM pulse.

15. The method of claim 13, further comprising:
providing the analog input signal from a lighting controller.

16. The method of claim 14, further comprising:
setting a unique said first reference value for each said analog input.

17. The method of claim 14, further comprising:
setting a unique said second reference value for each said analog input.

* * * * *